US010960950B2

(12) United States Patent
Zona (10) Patent No.: US 10,960,950 B2
(45) Date of Patent: Mar. 30, 2021

(54) FOLDING URBAN MOBILITY VEHICLE

(71) Applicant: Hydra Consulting S.r.l., Pinerolo (IT)

(72) Inventor: Mauro Zona, Turin (IT)

(73) Assignee: HYDRA CONSULTING S.R.L., Pinerolo (IT)

( * ) Notice: Subject to any disclaimer, the term of this patent is extended or adjusted under 35 U.S.C. 154(b) by 0 days.

(21) Appl. No.: 16/596,864

(22) Filed: Oct. 9, 2019

(65) Prior Publication Data

US 2020/0130769 A1 Apr. 30, 2020

(30) Foreign Application Priority Data

Oct. 31, 2018 (IT) .......................... 102018000009994

(51) Int. Cl.
| | |
|---|---|
| *B62K 15/00* | (2006.01) |
| *B62K 5/027* | (2013.01) |
| *B62K 5/05* | (2013.01) |
| *B62K 5/08* | (2006.01) |
| *B62J 1/12* | (2006.01) |

(52) U.S. Cl.
CPC ............ *B62K 15/008* (2013.01); *B62K 5/027* (2013.01); *B62K 5/05* (2013.01); *B62K 5/08* (2013.01); *B62J 1/12* (2013.01); *B62K 2202/00* (2013.01)

(58) Field of Classification Search
CPC ........ B62K 15/008; B62K 5/027; B62K 5/05; B62K 5/08; B62K 2202/00; B62K 15/00; B62J 1/12
See application file for complete search history.

(56) References Cited

U.S. PATENT DOCUMENTS

| | | | |
|---|---|---|---|
| 6,267,824 B1* | 7/2001 | Ishiwata ................ | B82Y 10/00 148/108 |
| 2002/0139591 A1 | 10/2002 | Wisecarver | |
| 2004/0130126 A1* | 7/2004 | Di Blasi ................ | B62K 5/027 280/639 |
| 2004/0187627 A1* | 9/2004 | Bass ...................... | B62K 15/00 74/551.3 |
| 2010/0126789 A1* | 5/2010 | Scragg ................... | B62K 5/027 180/208 |
| 2019/0023347 A1* | 1/2019 | Block .................... | B62K 5/025 |

FOREIGN PATENT DOCUMENTS

WO 2018017040 A1 1/2018

OTHER PUBLICATIONS

Italian Search Report for IT201800009994 dated Jun. 24, 2019.

* cited by examiner

*Primary Examiner* — Darlene P Condra
(74) *Attorney, Agent, or Firm* — Heslin Rothenberg Farley & Mesiti P.C.; Victor A. Cardona, Esq.

(57) ABSTRACT

A folding urban mobility vehicle includes a frame, a pair of front wheel assemblies carried by respective front arms articulated to the frame about a first axis, and a rear wheel assembly carried by a rear arm articulated to the frame about a second axis. In a folded configuration of the vehicle the front wheel assemblies are located within the frame and the rear wheel assembly extends within the frame between the two front wheel assemblies.

8 Claims, 10 Drawing Sheets

FOLDING URBAN MOBILITY VEHICLE

CROSS REFERENCE TO RELATED APPLICATIONS

This application claims priority from Italian Patent Application No. 102018000009994 filed on Oct. 31, 2018, the entire disclosure of which is incorporated herein by reference.

FIELD OF THE INVENTION

The present invention relates, in general, to vehicles for urban mobility.

More specifically, the invention relates to a folding urban mobility vehicle, in particular for elderly people.

DESCRIPTION OF THE PRIOR ART

Vehicles for urban mobility for elderly people are typically four-wheeled electric vehicles with a non-foldable structure.

Electric vehicles for urban mobility for elderly people are becoming increasingly more widespread due to the increasing average age of the population. One of the problems limiting the diffusion of vehicles for urban mobility for elderly people is the need to have a parking space near the user's home. In fact, vehicles for urban mobility of elderly people currently commercially available are generally not easily transportable inside homes.

OBJECT AND SUMMARY OF THE INVENTION

The object of the present invention is to provide a vehicle for urban mobility for elderly people that can be easily folded into a configuration that allows transport of the vehicle inside residences, even using small elevators.

According to the present invention, this object is achieved by a folding urban mobility vehicle comprising:
  a frame,
  a pair of front wheel assemblies carried by respective front arms articulated to the frame about a first axis, and
  a rear wheel assembly carried by a rear arm articulated to the frame about a second axis,
  wherein each of said front arms comprises a first arm section articulated to the frame and a second arm section carrying the respective front wheel assembly and articulated to the respective first arm section about a third axis inclined with respect to said first axis,
  wherein the front arms are movable between an extended configuration in which the second arm sections are arranged according to a general V-shaped configuration so that the track between said front wheel assemblies is greater than the width of said frame, and a retracted configuration in which the second arm sections of the front arms are close together in a configuration wherein the distance between the front wheel assemblies is less than said width of said frame and in which the front arms are rotated backwards about said first axis with respect to the configuration of use,
  wherein said rear arm is rotatable about said second axis between an extended position in which the rear arm extends from a rear part of the frame and a retracted position in which the rear arm is rotated forwards about said second axis with respect to the configuration of use, and
  wherein in a folded configuration of the vehicle the front wheel assemblies are located within the frame and the rear wheel assembly extends within the frame between the two front wheel assemblies.

Preferred embodiments of the invention form the subject of the dependent claims.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

DETAILED DESCRIPTION

Figure 1:
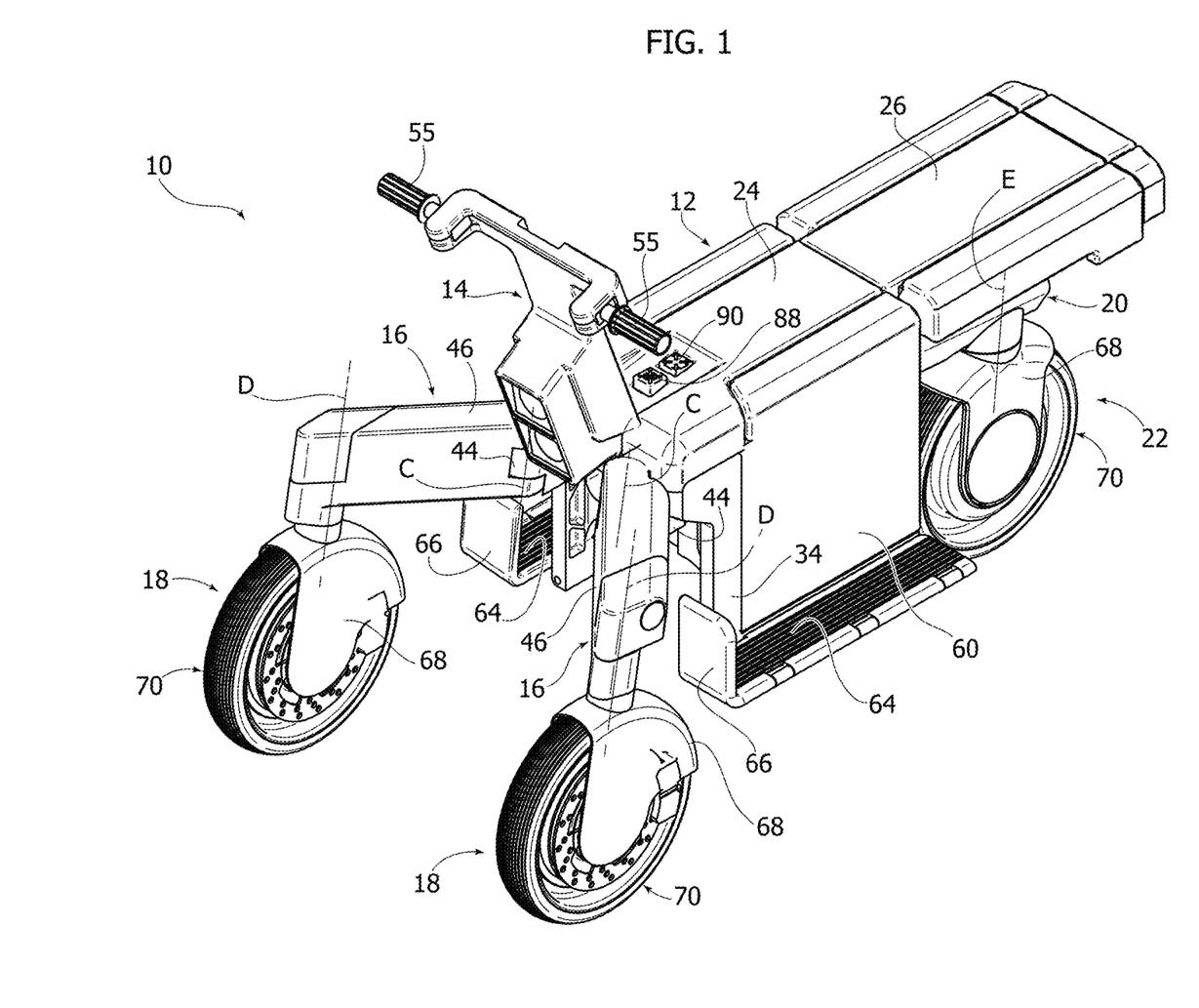
FIG. 1 is a perspective view of a folding urban mobility vehicle according to the present invention in the configuration of use.

In FIG. 1, numeral 10 indicates a folding urban mobility vehicle according to the present invention in the configuration of use. The vehicle 10 comprises a central body 12 from which a handlebar 14 extends, two front arms 16 carrying respective front wheel assemblies 18 and a rear arm 20 carrying a rear wheel assembly 22.

The vehicle 10 comprises a driver's seat 24 located on the upper part of the central body 12, and a passenger's seat 26 which extends backwards from the central body 12. In the configuration of use, the driver's seat 24 and the passenger's seat 26 can extend in a horizontal plane.

Figure 2:
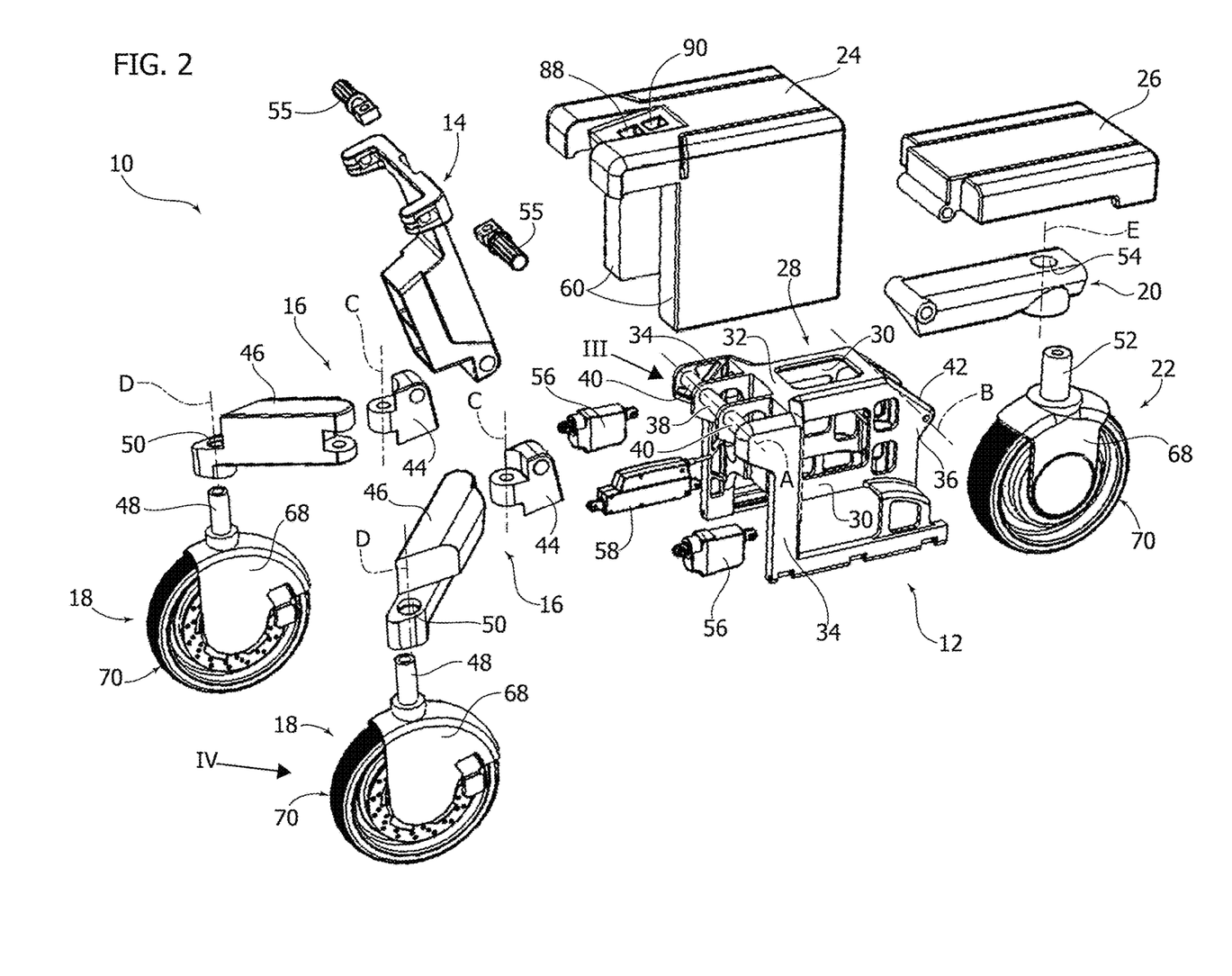
FIG. 2 is an exploded perspective view of the vehicle of FIG. 1.

With reference to FIG. 2, the vehicle 10 comprises a metal frame 28 having two side sections 30, an upper section 32, a front section 34 and a rear section 36. The frame 28 is empty between the two side sections 30 and is open on its lower side. The front section 34 of the frame 28 carries a central pin 38 and two side pins 40 that can be aligned with each other on a first axis A, transverse with respect to the longitudinal axis of the vehicle 10. The handlebar 14 and the two front arms 16 are articulated on the central pin 38 and on the two lateral pins 40, respectively. The rear section 36 of the frame 28 carries a rear pin 42 defining a second axis B, transverse to the longitudinal axis of the vehicle 10, about which the rear arm 20 is articulated.

With reference to FIG. 2, each of the two front arms 16 comprises a first arm section 44 and a second arm section 46. The first arm section 44 of each front arm 16 is articulated to the frame 28 about the first axis A by means of the respective lateral pin 40. The second arm section 46 of each front arm 16 is articulated to the respective first arm section 44 about a third axis C inclined with respect to the first axis A. The third axis C can be a vertical axis orthogonal with respect to the first axis A. Each of the second arm sections 46 carries a respective front wheel assembly 18. Each front wheel assembly 18 is rotatable with respect to the second arm section 46 of the respective front arm 16 about a respective fourth axis D. For example, each front wheel assembly 18 can have a pin 48 which rotatably engages a respective hole 50 of the second arm section 46 of the respective front arm 16 about a fourth axis D.

Similarly, the rear wheel assembly 22 is rotatable with respect to the rear arm 20 about a fifth axis E. In this case as well, the rear wheel assembly 22 can be provided with a pin 52 that rotatably engages a hole 54 of the rear arm 20 about the fifth axis E.

Each wheel assembly 18, 22 is associated with a rotating electric actuator that controls rotation of the respective wheel assembly 18, 22 about the respective axis D, E. The rotating electric actuators associated with the wheel assemblies 18, 22 can be electric motors arranged between the pins 48, 52 and the respective holes 50, 54. The rotating electric actuators of the wheel assemblies 18, 22 are associated with respective encoders and are controlled by an electronic control unit that controls the steering of the wheel assemblies 18, 22 about the respective axes D, E according to the steering control imparted by the user by means of at least one handle 55 of the handlebar 14. One or both the handles 55 of the handlebar 14 can be pivotable with respect to the handlebar 14 to control the steering movement.

With reference to FIG. 2, the vehicle 10 comprises two linear electric actuators 56 associated with respective front arms 16 and a linear electric actuator 58 associated with the rear arm 20. The linear electric actuators 56, 58 have respective ends articulated to the frame 28 and to the respective arm 16, 20, and are arranged to control the movement of the front arms 16 and of the rear arm 20 about the axes A and B, between an extracted position and a retracted position.

The linear electric actuators 56 are articulated to respective second arm sections 46 of the front arms 16 and control both the pivoting of the first arm sections 44 about the first axis A, and the pivoting of the second arm sections 46 with respect to the first arm sections 44 about the respective third axes C.

With reference to FIG. 2, the vehicle 10 may comprise two side panels 60 extending downwards from the driver's seat 24 and located on opposite sides of the frame 28 outside the respective side sections 30 of the frame 28. The electronic units for controlling the electric motors and actuators of the vehicle 10 can be housed within the side panels 60. Housings can be provided within the frame 28 for batteries that supply the motors and electric actuators of the vehicle 10.

Figure 3:
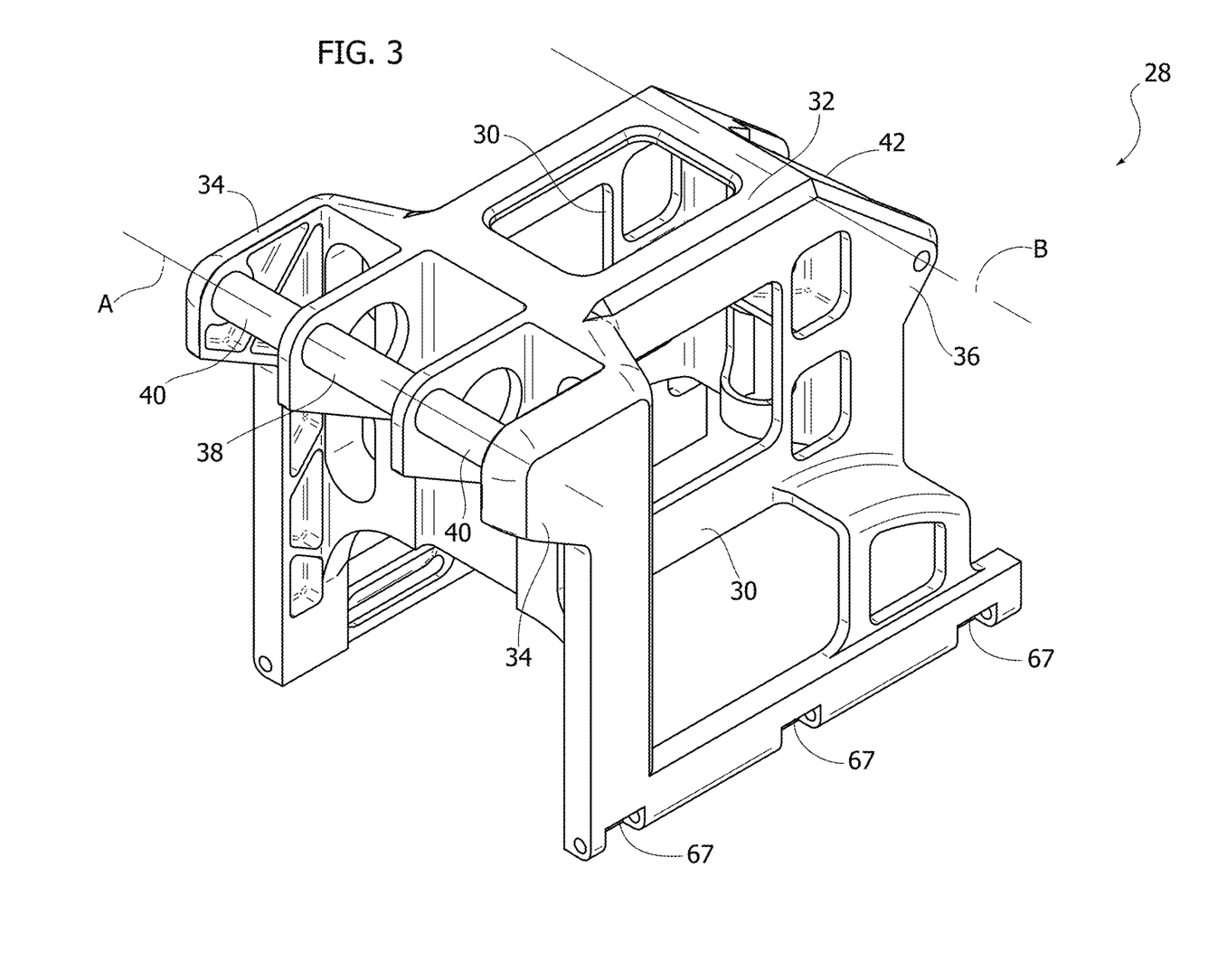
FIG. 3 is a perspective view of the frame indicated by the arrow III in FIG. 2.

With reference to FIG. 1, the vehicle 10 can comprise two footrests 64 for supporting the feet of the driver and the passenger. The footrests 64 can have respective front edges 66 folded upwards. The footrests 64 can be articulated at the lower edges of the frame 28 about respective horizontal longitudinal axes. In FIG. 3, numeral 68 indicates the housings for the pivot pins of one of the footrests 64.

With reference to FIGS. 1 and 2, each wheel assembly 18, 22 comprises a wheel support 68 and a wheel 70. The wheel support 68 is fixed to the pin 48, 52 which engages the hole 50, 52 of the respective arm 16, 20.

Figure 4:
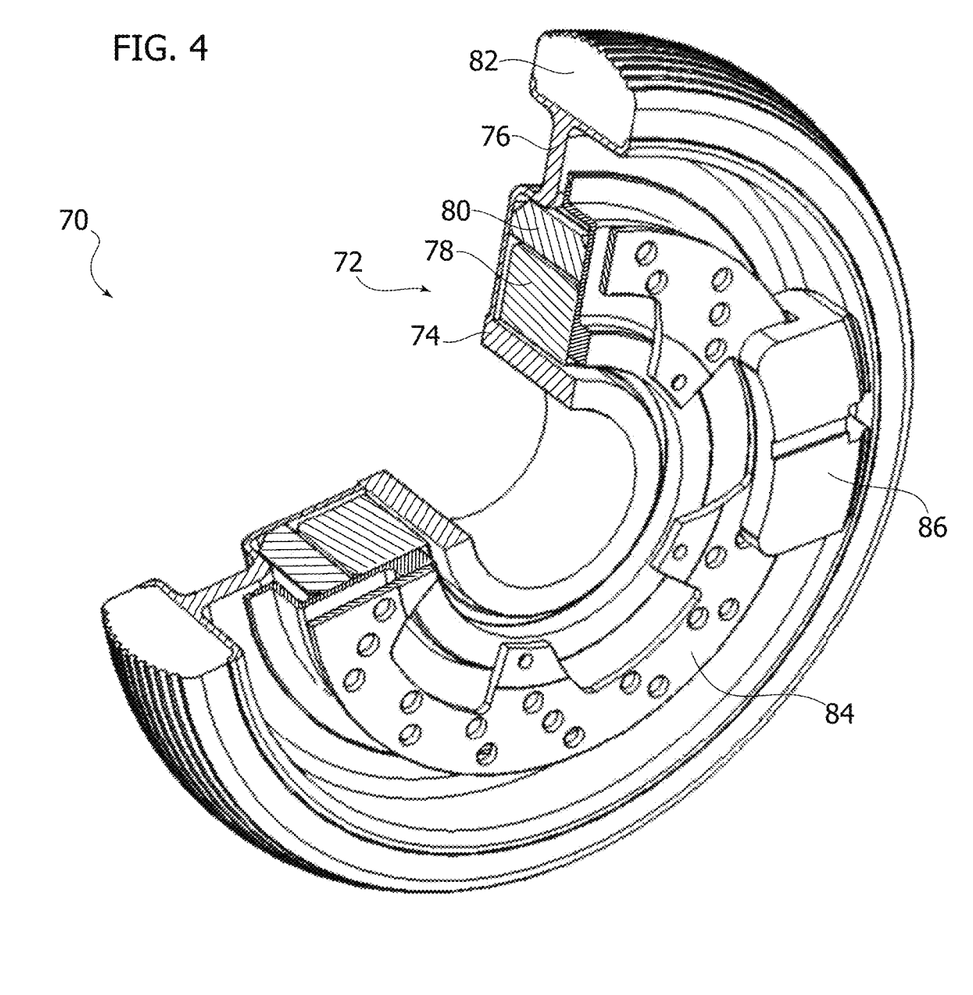
FIG. 4 is a partially cross-sectioned perspective view of a wheel indicated by the arrow IV in FIG. 2, and FIGS. 5-10 are perspective views illustrating the sequence of operations for folding the urban mobility vehicle of FIG. 1 into a closed configuration.

With reference to FIG. 4, each wheel 70 comprises an electric motor 72 including an inner stator 74 and an outer rotor 76. The stator 74 is fixed with respect to the wheel support 68 and carries stator windings 78. The rotor 76 carries permanent magnets 80 cooperating with the stator windings 78. The rotor 76 has an outer rim on which a tire 82 is mounted, formed for example by a full rubber ring. The wheel 70 may comprise a brake including a brake disc 84 fixed to the stator 74 and a brake caliper 86 fixed to the rotor 76. The brake is optional because braking can be controlled electrically via the electric motor 72.

In the configuration of use illustrated in FIG. 1, the front arms 16 and the rear arm 20 are locked in the extracted position and are fixed with respect to the frame 28. In the configuration of use, the handlebar 14 is locked in the raised position and is fixed with respect to the frame. The wheel assemblies 18, 22 are rotatable about the respective axes D, E to carry out the steering movements. The steering movements of the wheel assemblies 18, 22 are controlled electrically, and a mechanical connection between the handlebar 14 and the wheel assemblies 18, 22 is not necessary. The steering movement of the wheel units 18, 22 is controlled by an electronic control unit that detects the pivoting movement of at least one of the handles 55 forwards or backwards relative to the handlebar 14, and consequently controls pivoting of the wheel assemblies 18, 22 about the axes D, E. A command can also be provided for arranging the wheels 70 so that the vehicle can rotate on itself to carry out rapid reversals of the direction of travel.

The wheel assemblies 18, 22 are equipped with respective electric motors 72. The electronic control unit controls the rotation speed of the wheels 70 about the respective rotation axes as a function of signals provided by an accelerator provided on one of the handles 55.

Figure 5:
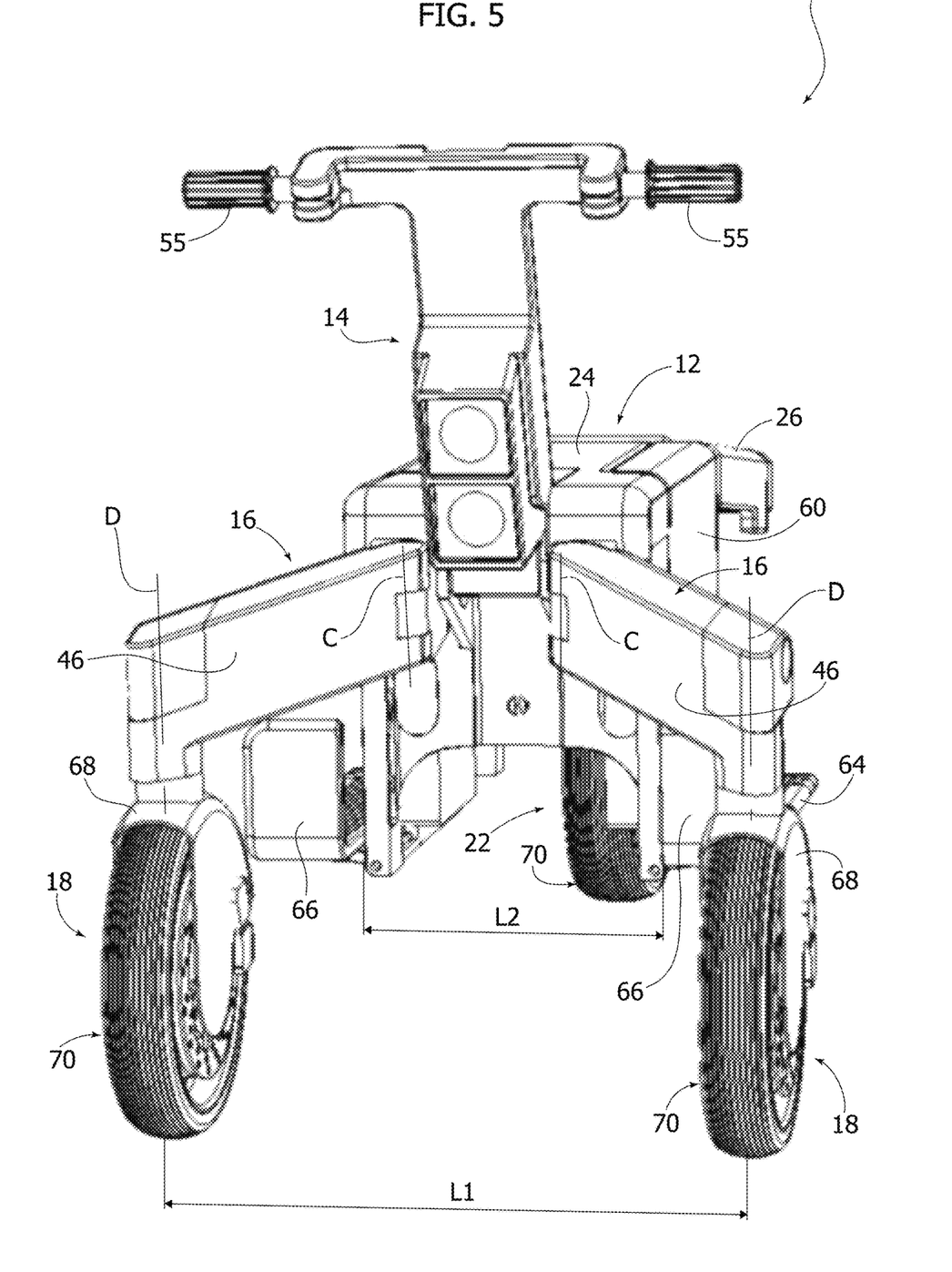

With reference to FIG. 5, in the configuration of use the front arms 16 are arranged according to a general V-shaped configuration so that the distance between the average planes of the front wheels 70 (track), indicated with L1, is greater than the width L2 of the frame 28. For example, the track L1 may vary from 484 mm to 661 mm and the width L2 of the frame 28 can be, for example, in the order of 344 mm.

FIGS. 6 to 10 illustrate the sequence of operations for folding the vehicle 10 into a closed storage configuration.

With reference to FIGS. 1 and 2, two push-buttons 88, 90 can be arranged on the front part of the driver's seat 24, which control the movement of the actuators 56, 58 towards an extended position or towards a retracted position.

Figure 6:
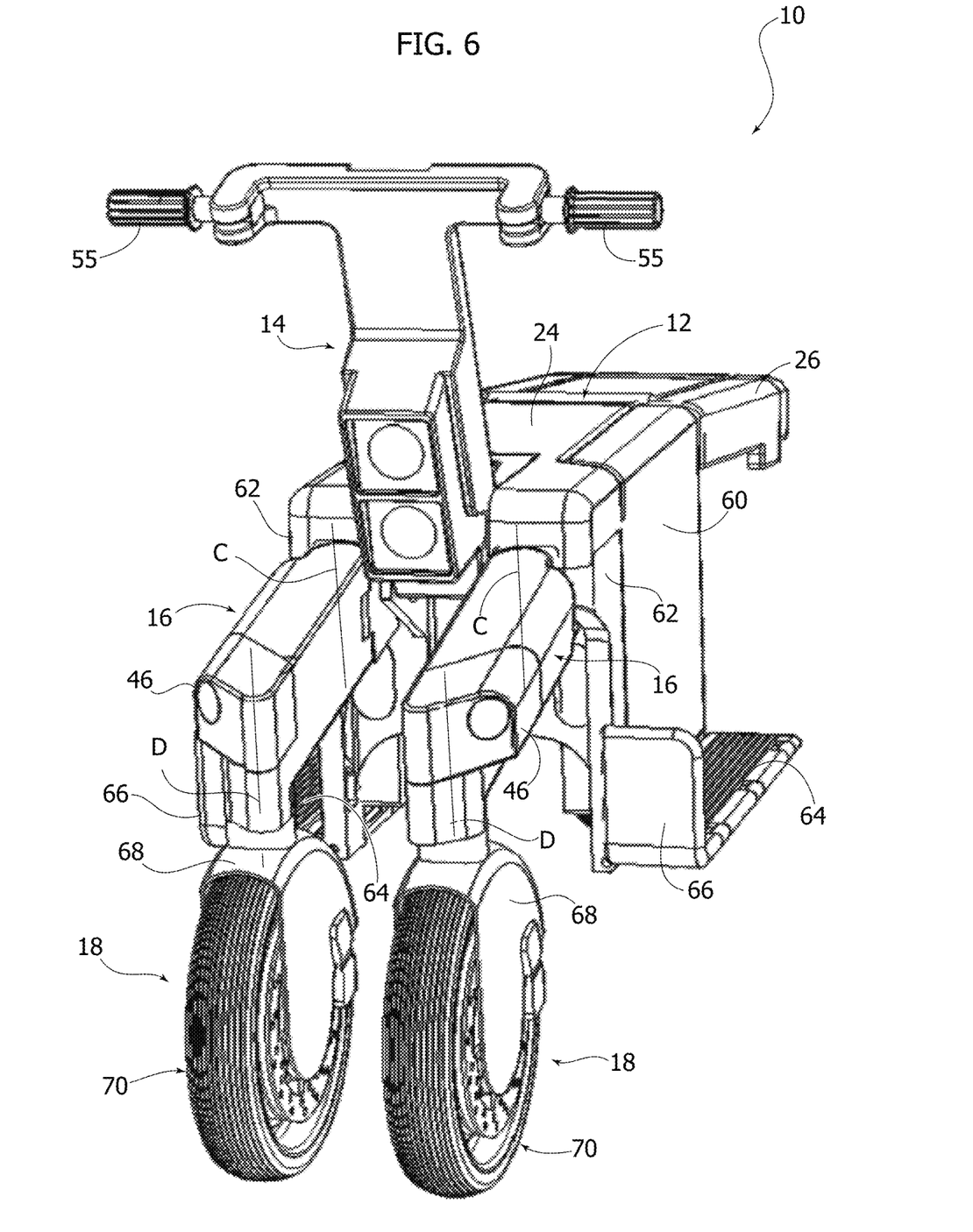

Starting from the configuration shown in FIG. 5, in a first step, the stop member that holds the passenger's seat 26 in the raised horizontal position is released. The passenger's seat 20 therefore rests on the rear arm 20. The push-button 88 is then pressed, which directs the movement of the actuators 56, 58 towards the retracted position. The actuators 56 associated with the front arms 16 act on the second arm sections 46 of the arms 16 and, in a first step of the stroke towards the retracted position, control rotation of the second arm sections 46 with respect to the first arm sections 44 of the arms 16 about the respective axes C, until the second arm sections 46 of the front arms 16 are arranged parallel to each other, as shown in FIG. 6.

Continuing the movement of the actuators 56 towards the retracted position, the first arm sections 44 of the front arms 16 rotate backwards about the first axis A, causing the front wheel assemblies 18 to move towards the inside of the frame 28. At the same time, the actuator 58 pivots the rear arm 20 forwards about the second axis B by moving the rear wheel assembly 22 towards the inside of the frame 28.

Figure 7:
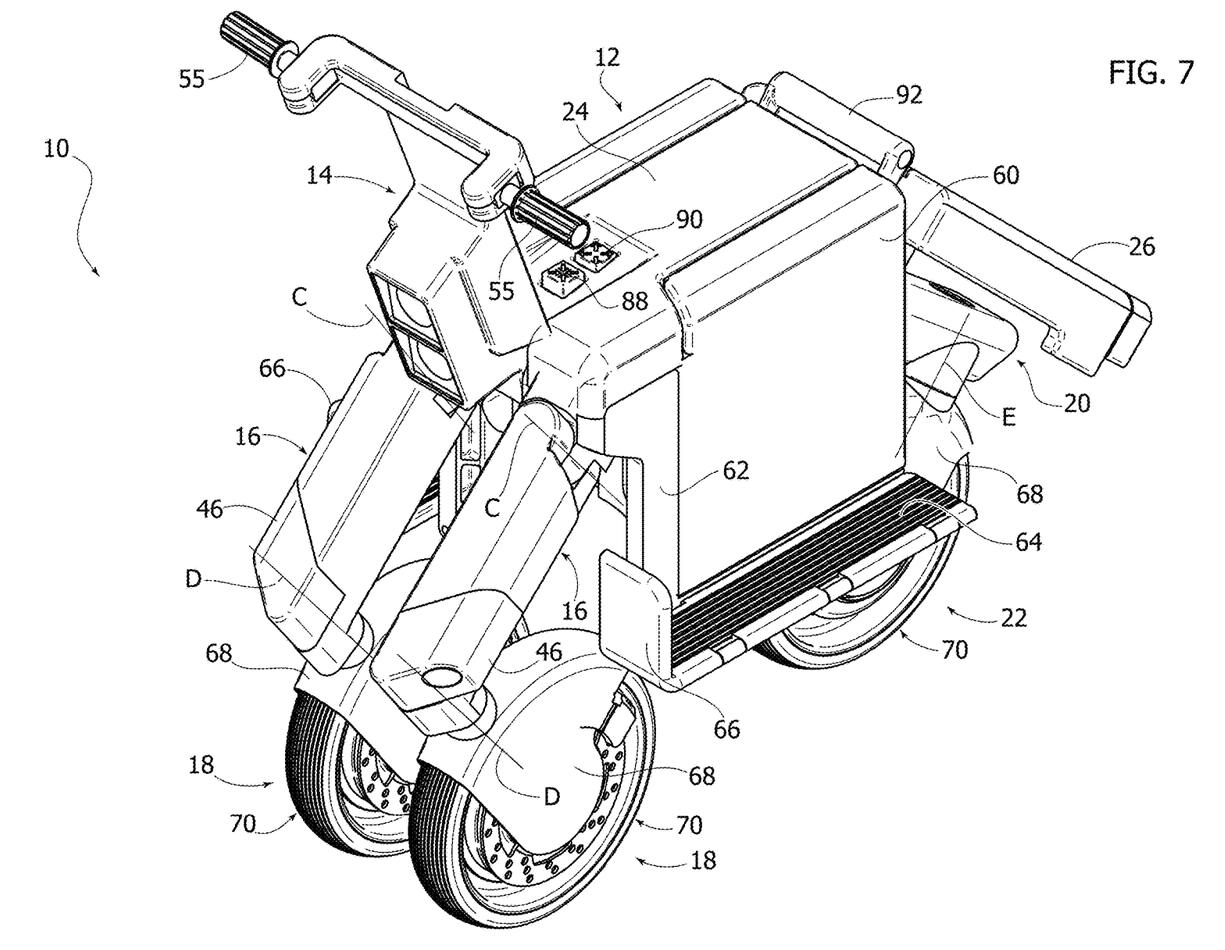

FIG. 7 illustrates the pivoting of the front arms 16 and of the rear arm 20 towards the inside of the frame 28. During this pivoting movement of the arms 16, 20, the wheels 70 constantly rest on the ground.

Figure 8:
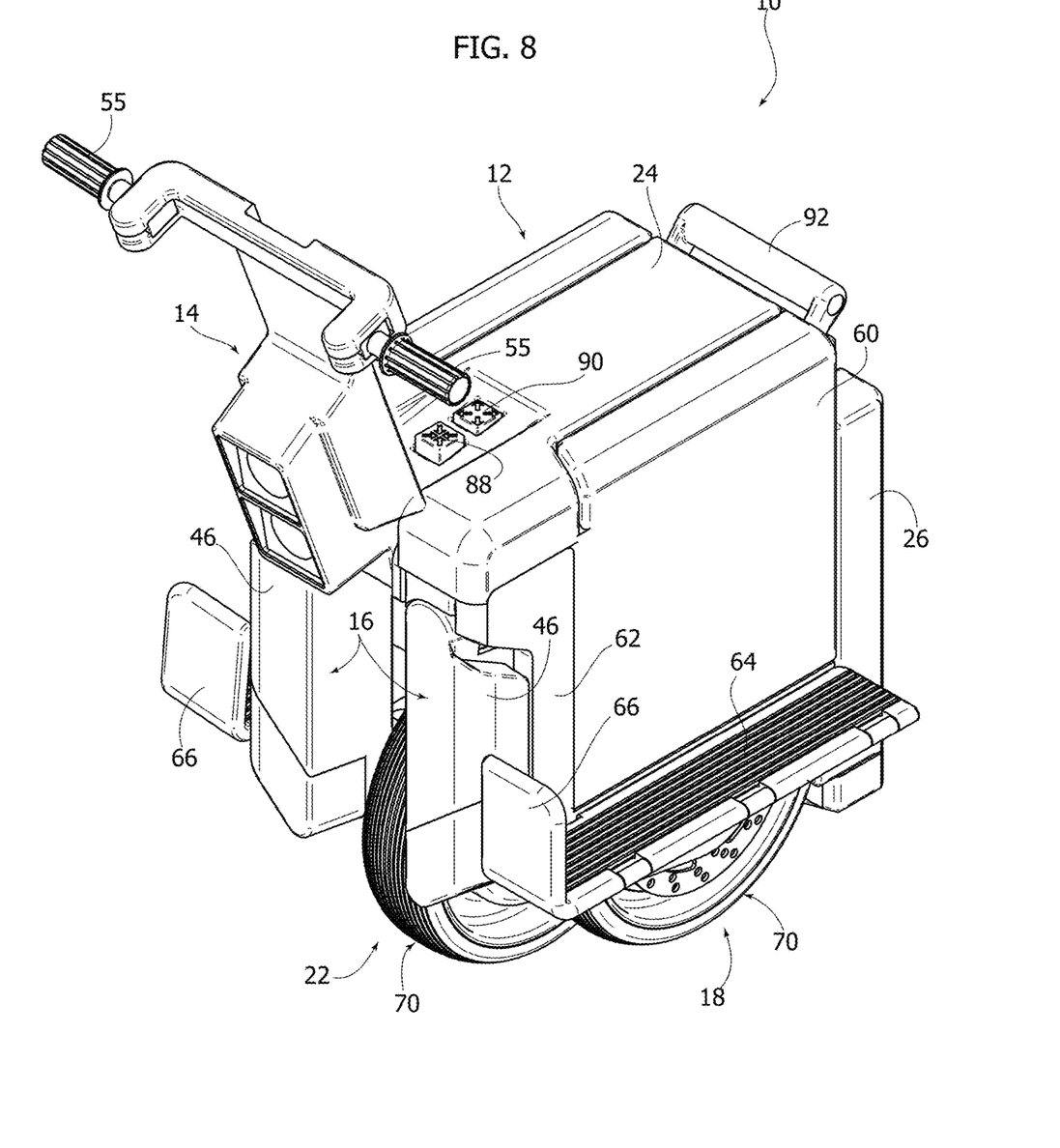

Pivoting of the front arms 16 about the first axis A and of the rear arm 20 about the second axis B continues until the front wheel assemblies are completely retracted inside the central body 12 of the vehicle, as shown in FIG. 8. In the configuration of FIG. 8, the rear wheel assembly 22 is completely retracted inside the central body and is located between the two front wheel assemblies 18.

The rear seat 26 swings downward until it is in a vertical position. In this condition, a handle 92 fixed to the frame 28 remains exposed beyond the rear edge of the driver's seat 24 and above the upper edge of the passenger's seat 26.

Figure 9:
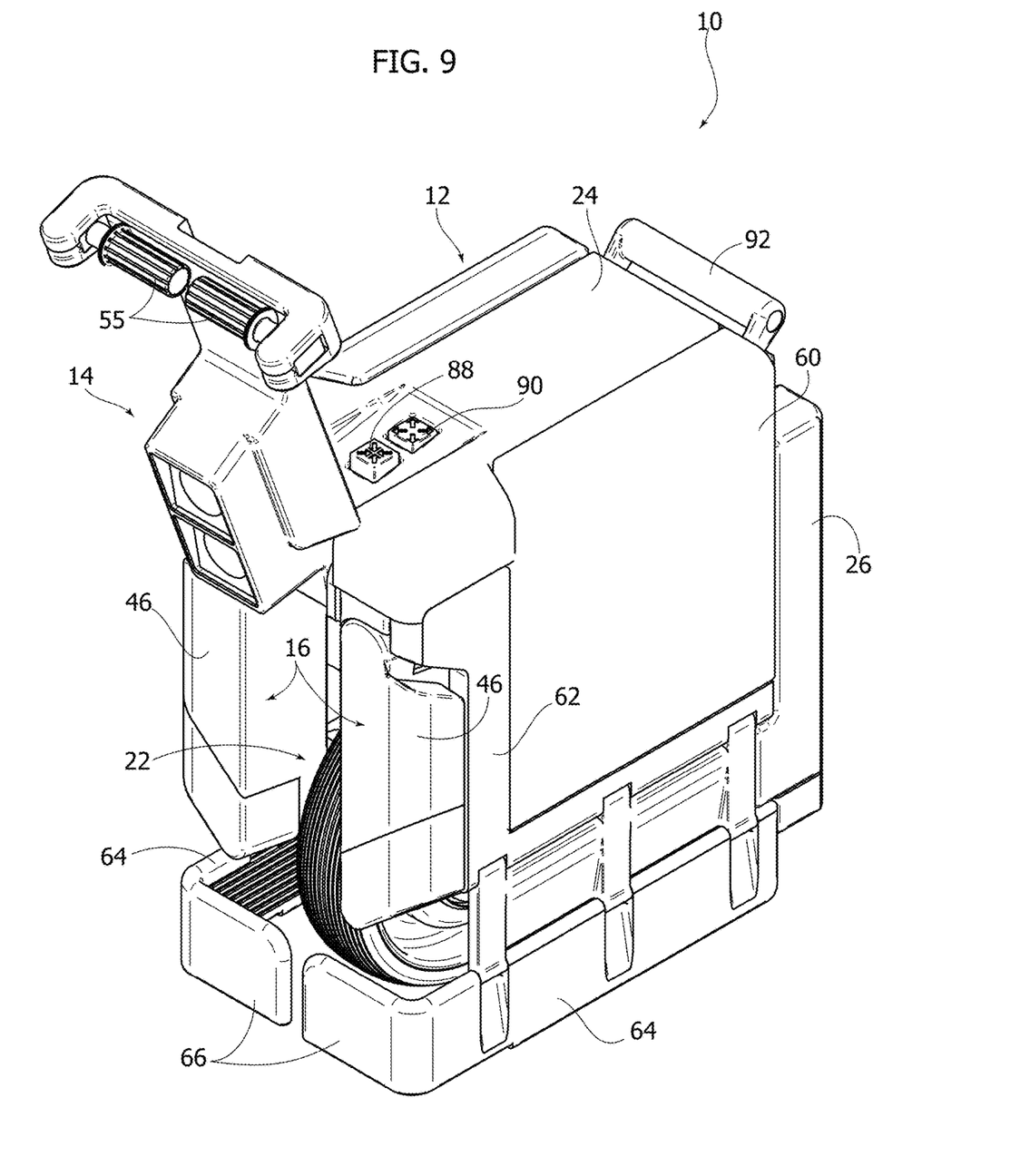

At this point, the footrests 64 are released and swing downwards by gravity, as shown in FIG. 9. In the lowered position the footrests 64 extend below the lower edge of the frame 28. The longitudinal parts of the footrests 64 in the lowered position extend parallel to the outer surfaces of the side panels 60. The front edges 66 of the footrests 64 extend transversely in front of the front edge of the central body 12, as shown in FIG. 9.

At this point, as shown in FIG. 9, the handles 55 are folded inwards. Then, the handlebar 14 is released and is made to swing downwards about the first axis A. In the completely lowered position the handlebar 14 is positioned between the two second arm sections 46 of the front arms 16, as shown in FIG. 10.

Figure 10:
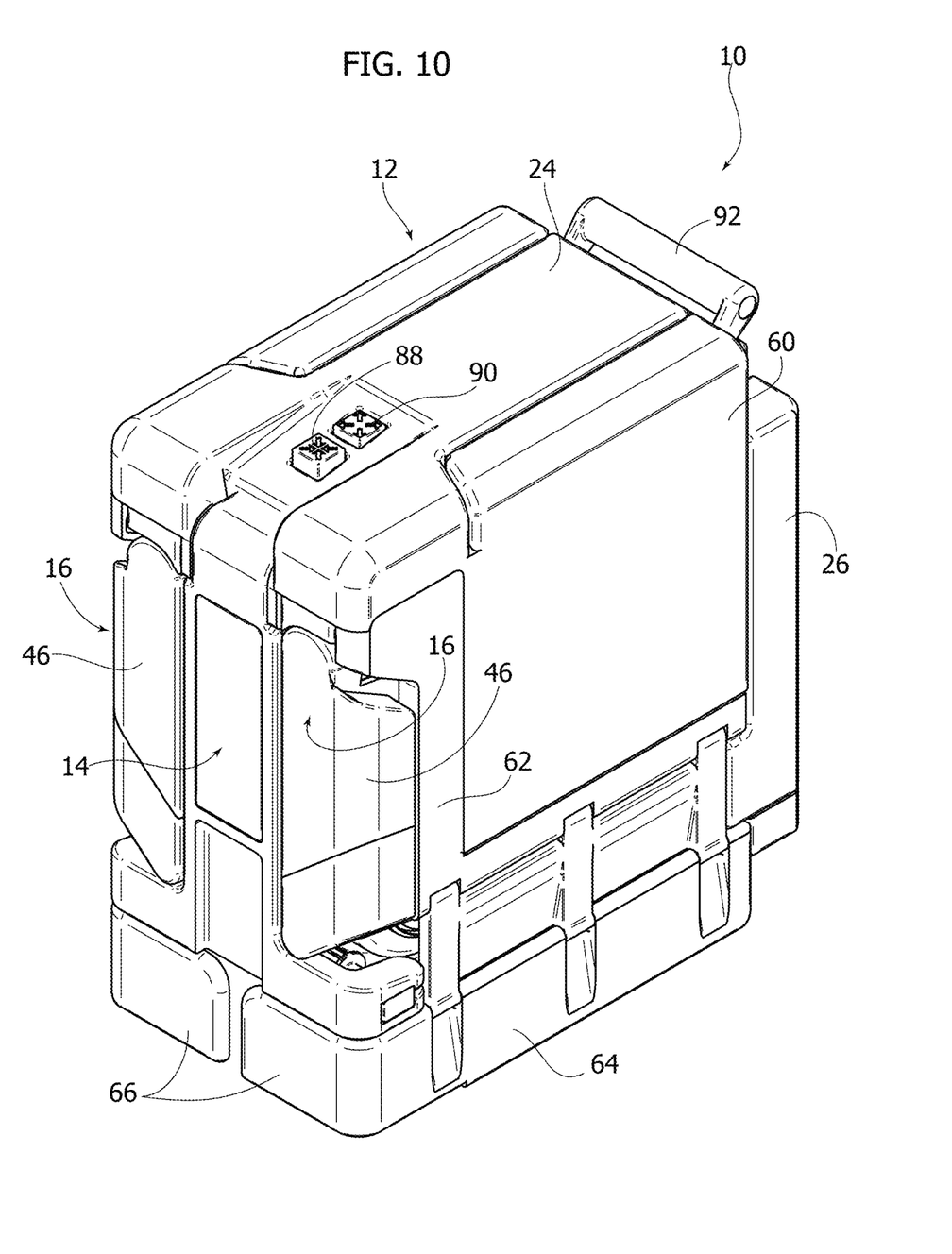

In the folded configuration shown in FIG. 10, the vehicle 10 substantially takes the form of a suitcase, which rests on the ground by means of the wheels 70, and which can be pulled as a trolley by means of the handle 92.

In one possible embodiment, the dimensions of the vehicle 10 in the folded configuration can be: length 609 mm, width 344 mm, height 692 mm. These dimensions allow passage of the vehicle in the folded configuration through standard-sized house doors and also allow loading the vehicle 10 in a folded configuration into an elevator of a condominium, even of small dimensions. In this way, the owner can easily take the vehicle to his/her apartment if he/she does not have a parking space on the ground floor.

The operations to transform the vehicle into the configuration of use are the same as described previously in reverse order. A particularly advantageous characteristic is that the closing and opening operations of the front arms 16 and of the rear arm 20 can take place completely automatically following the simple pressure of a push-button by the user.

Another particularly advantageous characteristic is that in the condition of use the front wheels have a wide track, greater than the width of the central body 12 of the vehicle 10, which ensures excellent conditions of stability of the vehicle 10.

Of course, without prejudice to the principle of the invention, the details of construction and the embodiments can be widely varied with respect to those described and illustrated, without thereby departing from the scope of the invention as defined by the claims that follow.

| LIST OF REFERENCE SYMBOLS | |
|---|---|
| vehicle | 10 |
| central body | 12 |
| handlebar | 14 |
| front arms | 16 |
| front arm assemblies | 18 |
| rear arm | 20 |
| rear arm assembly | 22 |
| driver's seat | 24 |
| passenger's seat | 26 |
| metal frame | 28 |
| side sections | 30 |
| upper section | 32 |
| front section | 34 |
| rear section | 36 |
| central pin | 38 |
| side pins | 40 |
| first axis | A |
| rear pin | 42 |
| first arm section | 44 |
| second arm section | 46 |
| third axis | C |

| LIST OF REFERENCE SYMBOLS -continued | |
|---|---|
| fourth axis | D |
| pin | 48 |
| hole | 50 |
| fifth axis | E |
| pin | 52 |
| hole | 54 |
| handles | 55 |
| linear electric actuators | 56 |
| linear electric actuator | 58 |
| side panels | 60 |
| footrests | 64 |
| front edges | 66 |
| housings | 67 |
| wheel support | 68 |
| wheel | 70 |
| electric motor | 72 |
| inner stator | 74 |
| outer rotor | 76 |
| stator windings | 78 |
| permanent magnets | 80 |
| tire | 82 |
| brake disc | 84 |
| brake caliper | 86 |
| wheel track | L1 |
| frame width | L2 |
| push-button | 88 |
| push-button | 90 |
| handle | 92 |

The invention claimed is:

1. A folding urban mobility vehicle comprising:
a frame,
a pair of front wheel assemblies carried by respective front arms articulated to the frame about a first axis, and
a rear wheel assembly carried by a rear arm articulated to the frame about a second axis,
wherein each of said front arms comprises a first arm section articulated to the frame and a second arm section carrying a front wheel assembly of the pair of front wheel assemblies and articulated to the respective first arm section about a third axis inclined with respect to said first axis,
wherein the front arms are movable between an extended configuration in which the second arm sections are arranged according to a general V-shaped configuration so that a track between said front wheel assemblies is greater than the width of said frame, and a retracted configuration in which the second arm sections of the front arms are close together in a configuration wherein the distance between the front wheel assemblies is less than said width of said frame and in which the front arms are rotated backwards about said first axis with respect to a configuration of use,
wherein said rear arm is rotatable about said second axis between an extended position in which the rear arm extends from a rear part of the frame and a retracted position in which the rear arm is rotated forwards about said second axis with respect to the configuration of use,
wherein in a folded configuration of the vehicle the front wheel assemblies are located within the frame and the rear wheel assembly extends within the frame between the two front wheel assemblies,
a pair of first linear actuators having opposite ends articulated between the frame and respective second arm sections of said front arms, and arranged to control a movement of the front arms between said extended position and said retracted position, and a second linear actuator having opposite ends articulated between the frame and said rear arm, and arranged to control a movement of said rear arm between said extended position and said retracted position.

2. The vehicle according to claim 1, comprising a handlebar articulated to the frame about a transverse axis and movable between a raised position of use and a lowered position, wherein in the raised position the handlebar extends upwards with respect to said frame and wherein in the lowered position the handlebar extends along a front side of the frame and is housed between the second sections of said front arms.

3. The vehicle according to claim 2, wherein said handlebar carries a pair of handles articulated to the handlebar and displaceable between an extended position and a folded position.

4. The vehicle according to claim 1, wherein each of said front wheel assemblies and said rear wheel assembly comprises a wheel support rotatable about a respective vertical axis located at a distal end of the respective arm and cooperating with a respective rotary electric actuator which controls a steering movement of the respective wheel assembly about the respective vertical axis.

5. The vehicle according to claim 4, wherein said rotary electric actuator comprises an electric motor including a stator fixed with respect to said wheel support and a rotor carrying a tire.

6. The vehicle according to claim 1, comprising a driver's seat and two side panels extending downwardly from the driver's seat and located laterally outside the frame, and a passenger's seat movable between a horizontal raised position and a lowered position in which the passenger's seat extends vertically along a rear side of the frame.

7. The vehicle according to claim 1, comprising a pair of footrests articulated to respective lower longitudinal edges of the frame and displaceable between a position of use in which they extend laterally outwards with respect to the frame and a lowered position in which said footrests extend in a vertical direction downwards from said lower longitudinal edges of the frame.

8. A folding urban mobility vehicle comprising:
a frame,
a pair of front wheel assemblies carried by respective front arms articulated to the frame about a first axis, and
a rear wheel assembly carried by a rear arm articulated to the frame about a second axis,
wherein each of said front arms comprises a first arm section articulated to the frame and a second arm section carrying a front wheel assembly of the pair of front wheel assemblies and articulated to the respective first arm section about a third axis inclined with respect to said first axis,
wherein the front arms are movable between an extended configuration in which the second arm sections are arranged according to a general V-shaped configuration so that a track between said front wheel assemblies is greater than the width of said frame, and a retracted configuration in which the second arm sections of the front arms are close together in a configuration wherein the distance between the front wheel assemblies is less than said width of said frame and in which the front arms are rotated backwards about said first axis with respect to a configuration of use,
wherein said rear arm is rotatable about said second axis between an extended position in which the rear arm extends from a rear part of the frame and a retracted position in which the rear arm is rotated forwards about said second axis with respect to the configuration of use,
wherein in a folded configuration of the vehicle the front wheel assemblies are located within the frame and the rear wheel assembly extends within the frame between the two front wheel assemblies, and
wherein each of said front wheel assemblies and said rear wheel assembly comprises a wheel support rotatable about a respective vertical axis located at a distal end of the respective arm and cooperating with a respective rotary electric actuator which controls a steering movement of the respective wheel assembly about the respective vertical axis.

* * * * *